United States Patent [19]
Dahlquist

[11] Patent Number: 4,703,157
[45] Date of Patent: Oct. 27, 1987

[54] ROBOT WRIST

[75] Inventor: Håkan Dahlquist, Västerås, Sweden

[73] Assignee: ASEA Aktiebolag, Västerås, Sweden

[21] Appl. No.: 880,174

[22] Filed: Jun. 30, 1986

[30] Foreign Application Priority Data

Jul. 3, 1985 [SE] Sweden .................... 8503312

[51] Int. Cl.$^4$ ............................ B23K 26/08
[52] U.S. Cl. .................. 219/121 LU; 219/121 LQ
[58] Field of Search ............ 219/121 LU, 121 LV, 219/121 LP, 121 LQ, 121 LR, 121 C, 121 LM, 121 LC, 121 LD

[56] References Cited

U.S. PATENT DOCUMENTS 3,986,767 10/1976 Rexer .................. 219/121 LV X
4,607,150 8/1986 Bannister ............... 219/121 LU X
4,618,758 10/1986 Gilli et al. .............. 219/121 LG

FOREIGN PATENT DOCUMENTS 2120202 11/1983 United Kingdom .
2134071 8/1984 United Kingdom .
2147877 5/1985 United Kingdom .
2153785 8/1985 United Kingdom ........... 219/121 L Primary Examiner—C. L. Albritton
Attorney, Agent, or Firm—Watson, Cole, Grindle & Watson

[57] ABSTRACT

A robot wrist is built up of three rotatable tubular wrist parts arranged one after the other, the axes of rotation of the first and the second part intersecting each other and the axis of rotation of the third part intersecting the longitudinal axis of the third part. Three mirrors are arranged inside the wrist, so that a light beam arriving along the axis of rotation of the first part passes unrefracted through the wrist irrespective of the rotary positions of the three wrist parts. The wrist enables processing by laser of workpieces with no restriction of the orientation capacity of the wrist.

4 Claims, 4 Drawing Figures

ROBOT WRIST

TECHNICAL FIELD

The present invention relates to a wrist for industrial robots that are primarily intended for the processing of materials by means of lasers. The wrist has a plurality of hollow, rotatable parts which are arranged in series with each other, and it comprises a first part which is rotatable about a first axis, a second part which is journalled in the first part and is rotatable about a second axis intersecting the first axis, and a third part which is journalled in the second part and is rotatable about a third axis intersecting the longitudinal axis of the third part. The third part supports a tool attachment, which is rotatable about the longitudinal axis of the third part.

BACKGROUND ART

A robot wrist of the above-mentioned type is previously known from UK Patent Publication No. GB-A-2 147 877 and is characterized by a great orientation capacity. When using such a robot for alignment of laser nozzles, however, it has not been possible to utilize this orientation capacity in full, since the robot arm in certain positions conceals the beam path to the laser nozzle. The present invention provides a solution to this problem.

Robot controlled laser processing has also been proposed previously. UK Patent Publication No. GB-A-2 134 071 shows such an application. To prevent the robot arm from obstructing laser beams directed towards the nozzle, according to this publication the nozzle is supported by a special hollow arm in which a plurality of mirrors perpendicularly reflect incident beams. This arm is connected so as to be synchronously moved by the robot arm. A special wrist, which supports the laser nozzle, is fixed to the arm which is synchronously controlled by the robot arm. In addition to the inconvenience caused by an additional arm, which has no function when the robot is used for purposes other than laser processing and which increases the space requirement and the cost of the robot and complicates its manufacture, a great number of mirrors are used according to this design, both at the point of deflection of the laser beam from the source of the beam to the wrist and from the special wrist to the laser nozzle. The great number of mirrors results in a considerable loss of radiation energy when transferring the laser beam from the beam source to the nozzle.

UK Patent Publication No. GB-A-2 120 202 shows another type of robot which can be employed for laser processing. This comprises a wrist supporting a laser nozzle, the wrist being rotatably and axially displaceably supported on a vertical shaft. This shaft is supported on a horizontally displaceable car, which in turn is supported on an additional car, which is horizontally displaceable in a direction perpendicular to the direction of displacement of the first car. In addition to being able to rotate about a vertical axis, as mentioned above, the wrist can also be rotated about a horizontal axis. Also with this design, the laser beam is deflected by means of mirrors pependicularly from the laser beam source to the nozzle. This known deflection arrangement has the disadvantage that the rotary movement of the wrist is limited to about 180° in order that the laser beam shall not be obstructed. A separate protective conduit of bellows type surrounds the laser beam from the source to nozzle.

SUMMARY OF THE INVENTION

According to the invention, the above-mentioned drawbacks in an industrial robot for laser beam manipulation are eliminated by arranging mirrors in the hollow interior of the wrist, so that a light beam arriving from a hollow robot arm may pass unrefracted through all parts of the wrist, irrespective of the mutual rotational positions of these parts. This results in a robot having small radiation energy losses because of a small number of mirrors, the mirrors being arranged in such a way that the beam path does not limit the orientation capacity of the robot wrist. By utilizing a hollow robot arm, the need of a separate protective gas conduit around the laser beam is also avoided.

According to an advantageous embodiment of the invention, the hollow robot arm and the wrist are utilized as a gas conduit for the protective gas generally used during laser processing.

BRIEF DESCRIPTION OF THE DRAWINGS

The above-mentioned advantages as well as other advantages of the invention, will be described more clearly in the following description, which describes in detail an embodiment of the invention with reference to the accompanying drawing, wherein.

DESCRIPTION OF THE PREFERRED EMBODIMENT

Figure 1:
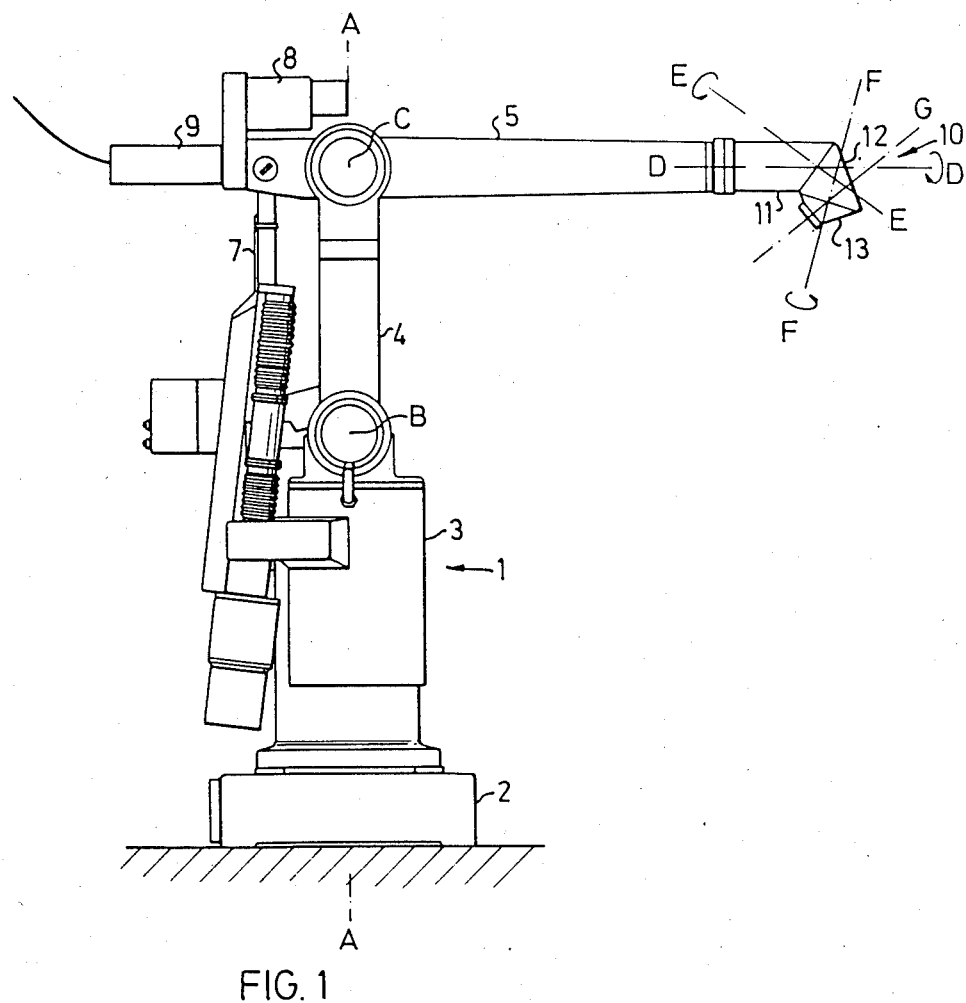
FIG. 1 is a side view of a computer-controlled industrial robot.

In the drawing, 1 designates an industrial robot having six axes. On the base plate 2 a pedestal 3 is rotatably journalled about an axis A—A. In this pedestal 3 an inner robot arm 4 is rotatably journalled about an axis B. The robot 1 also comprises an outer arm 5, which is fixed by its inner portion to the arm 4 and which is rotatable about an axis C. The pedestal 3 is operated by means of a drive means (not shown) arranged inside the base plate 2; the arm 4 is operated by means of a drive device 6 and the arm 5 is operated by a drive device 7, the main part of which is concealed by the drive device 6. Drive devices 8 for driving a wrist 10 and a laser beam source 9 are arranged in the extension of the inner part of the arm 5.

The wrist 10 is built up of three parts 11, 12, 13 arranged one after each other and being rotatable in relation to each other. The first part 11 is rotatable about an axis D—D, the second part 12 is rotatable about an axis E—E, and the third part 13 is rotatable about an axis F—F. The entire wrist 10 constitutes an easily replaceable unit because its first part 11 can be connected together with a tubular drive shaft 15 journalled in the robot arm 5.

The wrist part 11 comprises a tubular sleeve 111 with an end which is cut away pependicularly to the axis D—D and has a threaded flange 112, through which the part 11 can be connected together with the drive shaft 15 by means of a threaded ring 113. At its other end the part 11 is obliquely cut at an acute angle α to an axis extending perpendicular to the axis D—D. From this it follows that the axis E—E, which is perpendicular to the cut end, makes an equally great angle α with the axis D—D.

A mirror S1 is fixed in the wall of the part 11 and is placed at the centre of the bevel cut end. This mirror S1 shall reflect a laser beam L along the axis E—E, the beam being incident on the centre of the outer robot arm 5 and extending coaxially with the axis D—D, and therefore the plane mirror surface makes an angle α/2 with the axis D—D.

The second part 12 of the wrist 10 comprises a tubular sleeve 121 which is cut obliquely at both ends. The cut-off ends converge with each other and their extensions intersect each other at an acute angle which is equal to 2α. Thus, the cross-section of the tubular sleeve 121, in a plane extending through the longitudinal axis of the tubular sleeve 121 and including the shortest and longest part thereof, has the shape of a lower part of an equilateral triangle, cut off parallel to the base, with a top angle of 2α. At the mid-point of the base a mirror S2 is placed pependicular to this plane, which also comprises the axis of rotation E—E around which the tubular sleeve 121 rotates.

Figure 2:
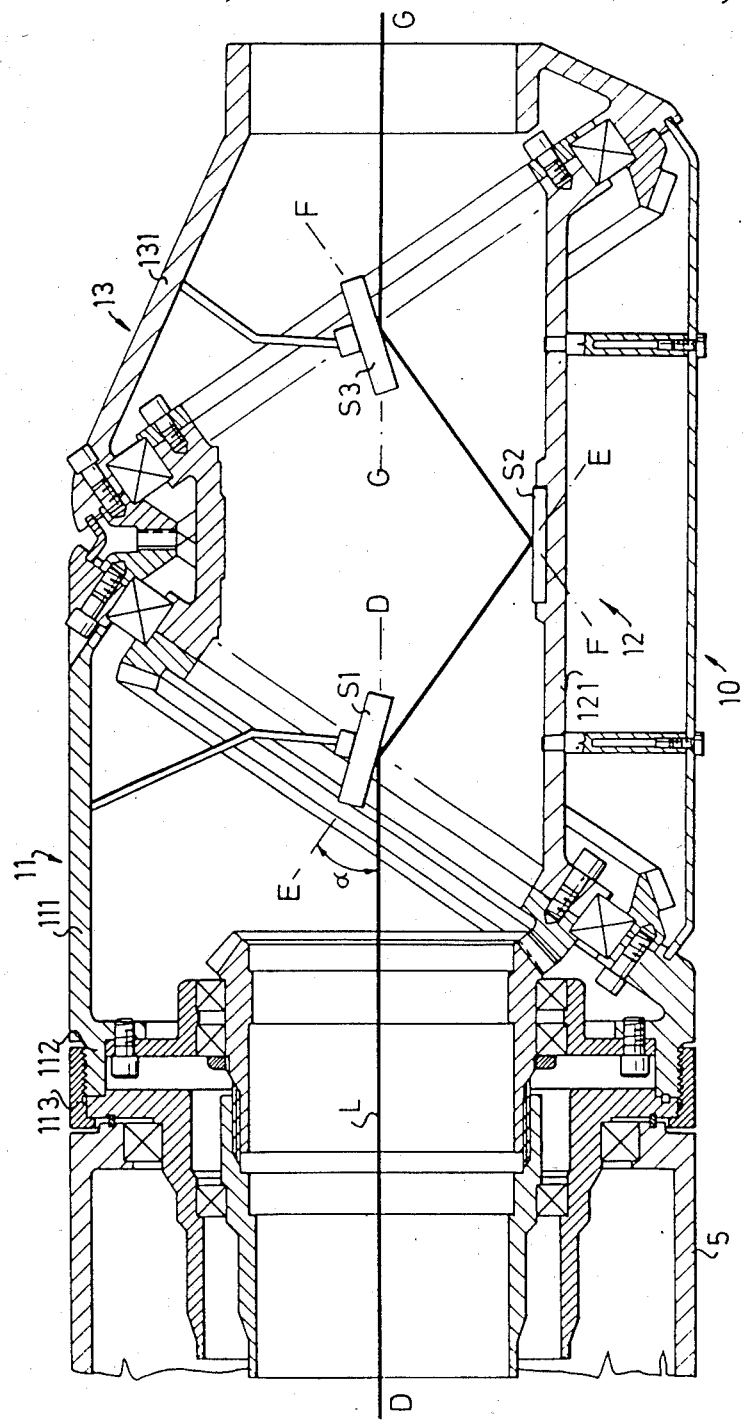
FIGS. 2 and 3 are cross-sections of a wrist according to the invention, the extreme axis of the wrist being oriented so as to coincide with the axis of the outer arm of the robot and making a maximum angle therewith, respectively.

The laser beam reflected by the mirror S1 along the axis of rotation E—E will consequently become incident at an angle α on the centre of the mirror S2, as will be most readily understood from FIG. 2, and from this mirror S2 the beam is reflected along the axis F—F owing to the symmetrical construction of the tubular body 121. In this connection it should be pointed out that, upon rotation of the second wrist part 12, the mid-point of the mirror S2 will remain stationary, since this point coincides with the axis E—E, around which the part 12 rotates. This point also coincides with the axis F—F, which passes through the midpoint of that end of the wrist part 12 which is located furthest away from the wrist part 11, perpendicularly to a plane comprising this end.

In the same way as the wrist parts 11, 12, the wrist part 13 also comprises a tubular sleeve 131. That end of the tubular sleeve which faces the part 12 is bevel cut at an angle α with a line perpendicular to the longitudinal axis G—G of the sleeve, 131 and the other end is cut perpendicular to the longitudinal axis. This second end also comprises a tool attachment 136 (see FIG. 4), which in the present example is used for the attachment of a laser nozzle and which is rotatable about the longitudinal axis G—G. At the centre of the bevel cut end there is placed a mirror S3, which is fixed to the wall of the wrist part 13. This mirror shall reflect the laser beam along the axis G—G which is incident along the axis F—F. Since the axes F—F and G—G always intersect each other at the angle α, the plane mirror S3 shall have an angle of inclination of α/2 with the axis G—G.

Figure 3:
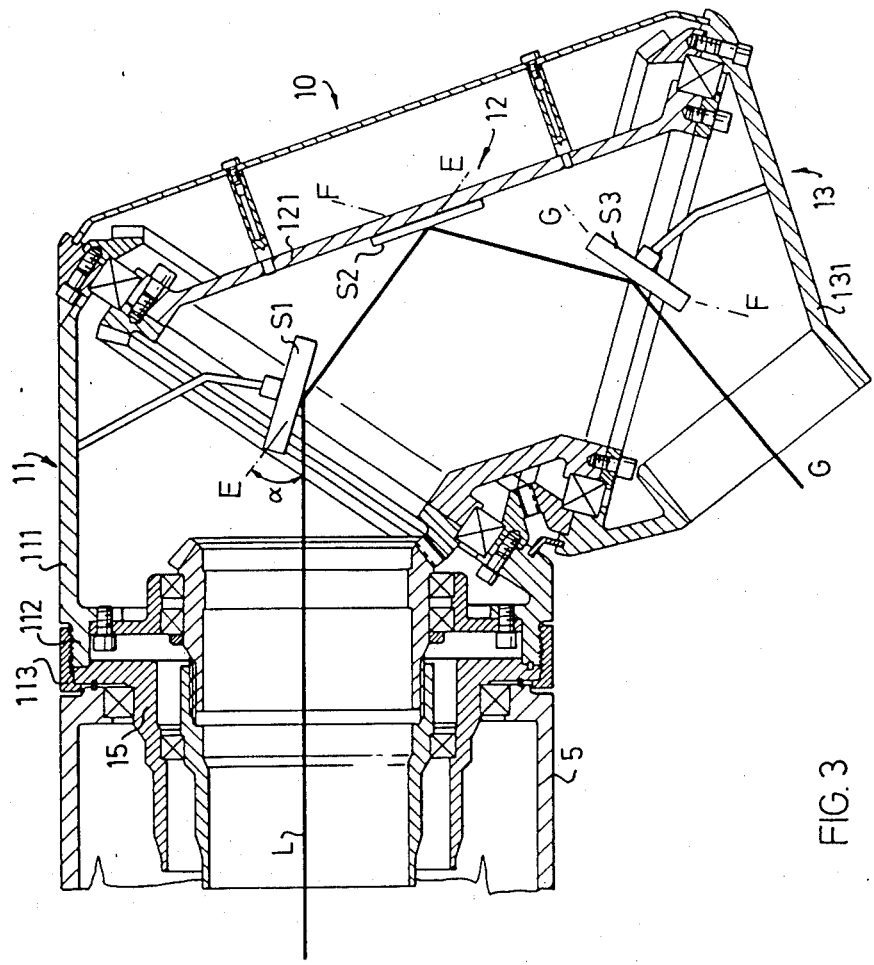

The rotary drive of the three parts of the wrist forms no part of the present invention, and for an understanding of the invention is it sufficient to know that these three parts can be rotated in relation to each other from the position shown in FIG. 2 to the position shown in FIG. 3. Otherwise, a detailed description of this rotary drive is given in the above-mentioned UK Patent Publication No. GB-A-2 147 877.

Figure 4:
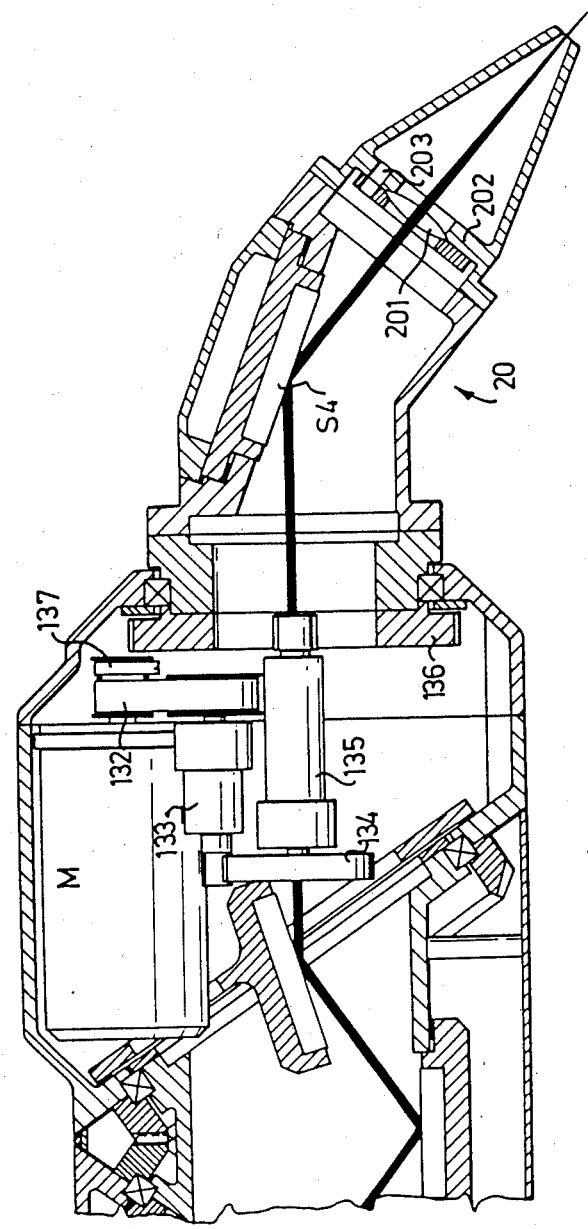
FIG. 4 is a side view, partially in cross-section, of the third wrist part with a cut-away side wall and a laser nozzle, according to the invention, which is fixed to the wrist.

In the preferred embodiment, the tool attachment 136 is rotated by means of a motor M, which is arranged in the wrist part 13 and which drives the input shaft in a gear 133 via a belt 132, the toothed output shaft of said gear 133 driving a gear wheel 134 with outer teeth. It should be noted in this connection that these parts must not disturb the laser beam path, and the gear 133 and the gear wheel 134 are thus not located at the centre of the tubular sleeve 131 but are displaced outwards from the mid-plane at such a distance that the gear wheel 134 does not interfere with the beam path. Thus, the belt 132 is directed downwards-outwards from the output shaft of the motor. A shaft fixedly connected to the gear wheel 134 constitutes the input shaft of an additional gear 135, the toothed output shaft of which is in engagement with an outer toothing of the tool attachment 136. As indicated in FIG. 4, the output shaft of the motor M is also connected, in a driving manner, with an additional belt 137, which passes obliquely inwards, away from the mid-plane of the tube sleeve, to a control device (not shown) designed to supply a signal which corresponds to the angle of rotation of the tool attachment 136, to the control circuit of the computer-controlled robot. It would, of course, be possible to have other embodiments of the rotary drive of the tool attachment than that described above, and the embodiment shown is only to be regarded as a non-restricting example.

FIG. 4 also shows a preferred embodiment of a laser nozzle 20. To further increase the orientation capacity of the robot, the outlet part of the nozzle is angularly adjusted in relation to the longitudinal axis G—G of the tube sleeve 13, and consequently the nozzle comprises a mirror S4 which reflects the laser beam along the outlet shaft of the nozzle which is incident along the axis G—G. A lens 201 is placed perpendicularly to the outlet shaft of the nozzle, which lens has such a focal distance that the incoming laser beam is focussed at a suitable distance outside the outlet opening of the nozzle. This lens is supported in a transverse wall 202, which also comprises an opening 203. This opening 203 is intended for the passage of a protective gas, oxygen or an inert gas, which flows through the hollow robot arm, through the wrist and out through the outlet opening of the nozzle. The wrist 10 can also be used together with a straight nozzle, in which case the mirror S4 is no longer necessary.

After completed laser processing, the mirrors may, where necessary, be cleaned by flushing a suitable cleaning fluid through the robot arm, the wrist and the laser nozzle.

Thus, by means of the invention an industrial robot is provided which, solely with the addition of a laser beam source, which is suitably located in the extension of the outer arm 5, and a nozzle, can be employed for laser processing of workpieces and which, by removal of the nozzle, can be employed without restriction for conventional processing. The number of mirrors, which conduct the laser beam through the arm 5 and the wrist 10, is only three, and therefore the energy losses from the source to the nozzle are small. Furthermore, these mirrors are arranged such that the laser beam is not obstructed independently of the mutual rotary positions of the three parts of the wrist.

The invention has been described with reference to laser beams, but, of course, other types of light beams can be led through the robot arm and the wrist.

What is claimed is:

1. The combination of a wrist mechanism and a plurality of mirrors, said wrist mechanism being attachable to a hollow robot arm and can support a working tool, said wrist mechanism comprising a first tubular wrist part which defines a first central axis therethrough and which has a first end and a second end, said first end being mountable on said robot arm so as to be rotatable about said first central axis and said second end having an oblique orientation relative to said first central axis, said first central axis defining a first rotation axis of said wrist mechanism, A second tubular wrist part which defines a second central axis therethrough and which has a first end and a second end, each of said first and second ends having an oblique orientation relative to said second central axis, first journal means for mounting the first end of said second tubular wrist part to the second end of said first tubular wrist part and to enable said second tubular wrist part to rotate relative to said first tubular wrist part about a second rotation axis which intersects said first central axis, a third tubular wrist part which defines a third central axis therethrough and which has a first end and a second end, said first end having an oblique orientation relative to said third central axis, second journal means for mounting the first end of said third tubular wrist part to the second end of said second tubular wrist part and to enable said third tubular wrist part to rotate relative to said second tubular wrist part about a third rotation axis which intersects said third central axis, bevel gear means interconnecting the second end of said first tubular wrist part with the first end of said third tubular wrist part so as to cause coordinated rotation therebetween, a tool attachment means, a third journal means for mounting said tool attachment means on the second end of said third tubular wrist part and to enable said tool attachment means to rotate relative to said third journal means about a fourth rotation axis which intersects said third rotation axis, and a plurality of mirrors arranged in the hollow interior of said wrist mechanism so that a light beam arriving from a hollow robot arm may pass unrefracted through all of said wrist parts, irrespective of the mutual rotary positions of said wrist parts, a first one of said plurality of mirrors being placed at the point of intersection between said first central axis and said second rotation axis, a second of said plurality of mirrors being placed at the intersecting point between said second rotation axis and said third rotation axis, and a third of said plurality of mirrors being placed at the intersecting point between said third rotation axis and third central axis, whereby said mirrors have such an inclination that a light beam arriving along said first central axis is diverted along said second and third rotation axes and said third central axis.

2. The combination wrist mechanism and plurality of mirrors according to claim 1, wherein said first and third mirrors are fixed to fixing elements projecting from the inner walls of said first and third wrist parts, respectively, and said second mirror is fixed directly to the inner wall of said second wrist part.

3. The combination wrist mechanism and plurality of mirrors according to claim 1, wherein a laser nozzle is fixed to said tool attachment, said laser nozzle having an outlet part which is inclined relative to said third central axis, and wherein said plurality of mirrors includes a fourth mirror which deflects the light beam arriving along said third central axis along said outlet axis of said nozzle.

4. The combination wrist mechanism and plurality of mirrors according to claim 3, wherein said laser nozzle includes a transverse wall which supports a focusing lens and is provided with a through-opening for protective gas.

* * * * *